United States Patent
Johnson

[15] 3,684,062
[45] Aug. 15, 1972

[54] FRICTION LINING COMPOSITION
[72] Inventor: Howard R. Johnson, Ann Arbor, Mich.
[73] Assignee: Kelsey-Hayes Company
[22] Filed: Jan. 29, 1971
[21] Appl. No.: 111,155

Related U.S. Application Data
[63] Continuation of Ser. No. 799,216, Feb. 14, 1969, abandoned.

[52] U.S. Cl. ...........................188/251 R, 188/251 A
[51] Int. Cl. ..............................................F16d 69/02
[58] Field of Search.188/251 R, 251 A, 251 M, 73.1; 60/847

[56] References Cited
UNITED STATES PATENTS
2,960,280   11/1960   Connelly et al..............188/83

FOREIGN PATENTS OR APPLICATIONS
554,977   3/1958   Canada................188/251 M
718,964   9/1965   Canada....................260/847

*Primary Examiner*—George E. A. Halvosa
*Attorney*—Harness, Dickey & Pierce

[57] ABSTRACT

An improved friction lining composition for vehicle brakes and the like possessing controlled dynamic friction properties and comprising a reinforcing material, conventional fillers and/or friction-modifying additives, a bonding agent and a controlled amount of a particulated fluorocarbon plastic dispersed throughout the lining.

11 Claims, 8 Drawing Figures

PATENTED AUG 15 1972
3,684,062
SHEET 1 OF 2
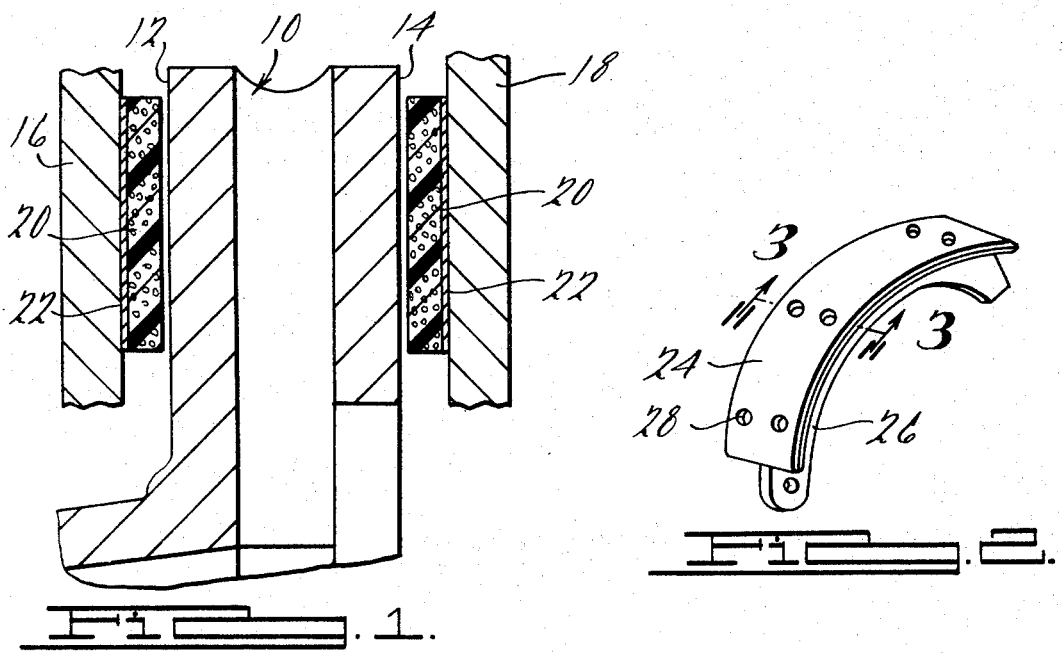
FIG. 1.
FIG. 2.
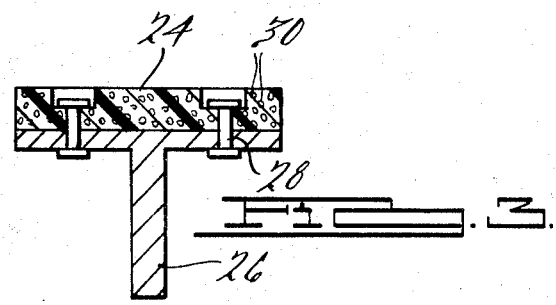
FIG. 3.
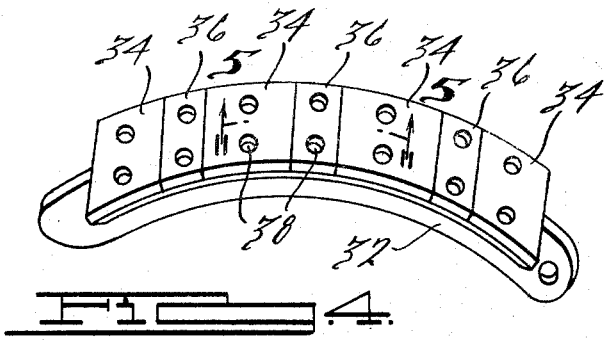
FIG. 4.
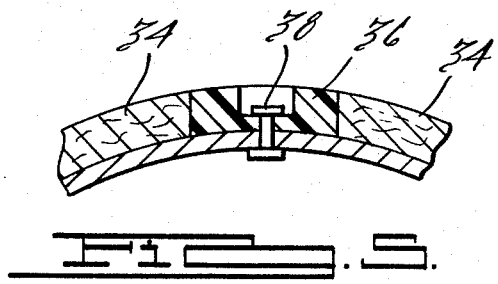
FIG. 5.
INVENTOR
Howard R. Johnson.
BY Harness, Dickey & Pierce
ATTORNEYS

PATENTED AUG 15 1972 3,684,062
SHEET 2 OF 2
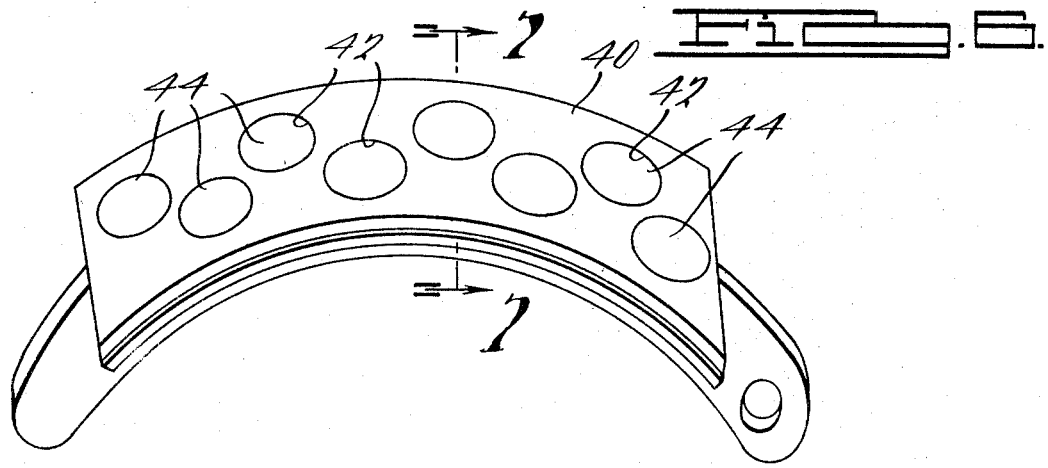
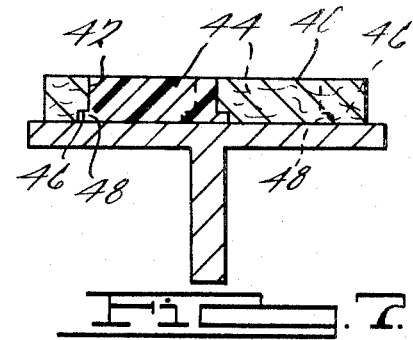
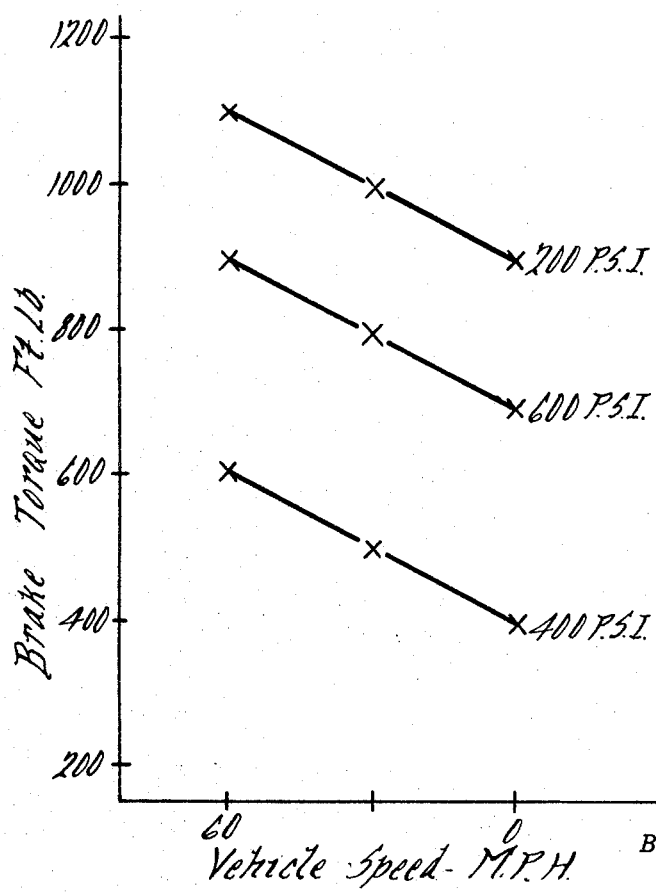
INVENTOR
Howard R. Johnson.
BY Harness, Dickey & Pierce
ATTORNEYS

FRICTION LINING COMPOSITION

CROSS REFERENCE TO RELATED APPLICATION

This application is a continuation of prior copending application Ser. No. 799,216, filed Feb. 14, 1969, for "Friction Lining Composition," now abandoned.

BACKGROUND OF THE INVENTION

The increased emphasis on vehicle safety has occasioned a variety of design modifications in vehicle passenger compartments and chassis components to improve driver and passenger safety in the event of impact, as well as improving the control response of vehicles. One phase in the program for improving the safety and handling characteristics of vehicles has involved modifications or proposed design modifications in vehicle braking systems in an effort to reduce or eliminate skid tendencies of a vehicle during high speed panic stops which usually are occasioned by a lockup of one or both of the rear wheels as a result of application of excessive braking forces during such high-speed stops. The various brake system designs used or proposed for use over the years to provide uniform braking of all wheels during deceleration have conventionally involved mechanical considerations including, for example, structural design changes in the individual brake assemblies, modifications in the system and manner by which controlled variations in the braking force applied to individual wheels is controlled, controlled variations in the relative braking capacity of braking assemblies at individual wheels, etc. While such design changes or proposed design changes have been successful in alleviating the skid characteristics of vehicles as further aggravated by the weight shift and nose dive characteristics of vehicles during rapid deceleration, the problem of vehicle skid is still present, particularly when relatively inexperienced drivers encounter situations requiring rapid deceleration of vehicles on slippery pavements.

The present invention overcomes many of the problems and disadvantages associated with the mechanical approaches heretofore used or proposed for use in alleviating the skidding tendencies of vehicles as the result of wheel lockup by providing an improved brake lining composition having a novel composition and possessed of unique friction characteristics, thereby substantially simplifying brake systems and providing for improved performance and reduced lining wear over a variety of operating conditions, as well as materially reducing the tendency of brake noise such as brake squeal and the like.

SUMMARY OF THE INVENTION

The advantages and benefits of the present invention are achieved by a brake assembly including a friction member adapted to frictionally engage a braking member and wherein the friction member incorporates a friction lining comprising a substantially rigid body comprised of a reinforcing material, such as asbestos, conventional fillers and/or friction-modifying additives, a binding agent and a controlled proportion of a fluorocarbon plastic selected from the group consisting of polytetrafluoroethylene and fluorinated ethylene propylene, or mixtures thereof, distributed through the lining and present in an amount of from about 5 to about 75 percent, and preferably from about 10 to about 60 percent, by weight of the friction lining. Friction linings in accordance with the present invention have been discovered to possess unique dynamic friction properties, whereby the dynamic coefficient of friction of the lining decreases as the sliding velocity between the friction lining and braking member decreases, reducing the tendency of wheel lockup. The specific dynamic friction characteristics of the friction lining can be varied within the aforementioned ranges to tailor the friction lining to a specific brake system.

The present invention further encompasses the method of eliminating or minimizing the tendency of vehicles to skid as a result of wheel lockup during a braking operation by incorporating vehicle brake assemblies of the present invention.

Additional advantages and benefits of the present invention will become apparent upon a reading of the description of the preferred embodiments, taken in conjunction with the accompanying drawings.

BRIEF DESCRIPTION OF THE DRAWINGS

FIG. 1 is a fragmentary vertical sectional view of a typical disk-type brake incorporating the friction lining of the present invention;

FIG. 2 is a perspective view of an arcuate brake shoe incorporating the friction lining;

FIG. 3 is a magnified transverse sectional view taken through the arcuate shoe shown in FIG. 2, as viewed along lines 3—3 thereof;

FIG. 4 is a plan view of a composite friction lining made in accordance with an alternative embodiment of the present invention;

FIG. 5 is a magnified fragmentary longitudinal sectional view through the friction lining shown in FIG. 4 and taken along the line 5—5 thereof;

FIG. 6 is a plan view of still another embodiment of a composite friction lining;

FIG. 7 is a magnified transverse sectional view of the friction lining shown in FIG. 6 and taken along the line 7—7 thereof; and FIG. 8 is a graph illustrating the dynamic friction characteristics of the friction lining of the present invention.

DESCRIPTION OF THE PREFERRED EMBODIMENTS

The proportions of the several constituents comprising the improved friction lining are described in terms of percentages by weight in the specification and subjoined claims unless expressly indicated otherwise.

The improved braking characteristics achieved by the novel friction lining of the present invention incorporating controlled proportions of fluorocarbon plastics is applicable to the various compatible lining compositions of the various types heretofore known. The composition of the friction lining typically includes one or a variety of reinforcing materials, various filler materials which may also serve to some degree as friction-modifying agents, a suitable binding agent for uniting the various constituents into a dense relatively rigid mass and the controlled proportion of the fluorocarbon resin in any one of a variety of physical forms.

Of the various reinforcing materials conveniently employed in friction lining compositions, asbestos fibers, either in a woven or a non-woven form, are perhaps most common in so-called organic-type friction linings. Various other fibrous-type materials can also be suitably employed for achieving the benefits of the present invention such as, for example, other inorganic fibers including glass and metal fibers, as well as organic fibers including assorted cellulose fibers and natural or synthetic fibers from various sources, which preferably are employed in combination with the asbestos fiber reinforcing material. The reinforcing material may broadly comprise from about 10 to about 90 percent of the lining composition, although amounts ranging from about 20 to about 70 percent, and more frequently from about 30 to about 60 percent, are conventional.

In addition to the reinforcing material, the friction lining further includes a suitable binding agent for uniting the several constituents into a substantially dimensionally stable mass having sufficient shear strength to withstand the forces applied thereto during use. Binding agents conventionally employed are of an organic type including any one of a variety of heat-resistant thermosetting resins and elastomers which broadly can be incorporated in amounts ranging from 5 to about 60 percent, more usually from about 10 to about 50 percent, and preferably from about 15 to about 30 percent of the friction lining composition. In accordance with recent brake technology, thermosetting-type resins, such as phenolic resins and polyimide resins, for example, which form tenacious bonds of the constituents have been found particularly satisfactory, of which the condensation product of phenol and formaldehyde constitutes a preferred and common binding agent within the broad class of thermosetting aldehyde-resins. Elastomeric binding agents are also in common use, of which the heat-resistant natural and synthetic rubbers including, for example, butadiene-styrene copolymers, butadiene acrylonitrile copolymers, polychloroprenes, of which chlorobutadiene is typical, and like materials can be satisfactorily employed in view of their good heat resistance and ability to be cured forming a tenacious bonding matrix with the friction lining material. Modified elastomeric materials incorporating controlled proportions of synthetic resins can also be employed to advantage and can be satisfactorily used in the formulation of the friction lining material comprising the present invention. Such modifying resins can be employed in varying amounts to effect a suitable fortification or rigidification of the resulting elastomer, enhancing its bonding characteristics, as well as the physical properties of the resultant friction material.

In addition to the conventional binding agent being employed in present friction lining materials, it is also contemplated that binding agents of the various types employed in the past, which now have been generally superseded by present-day binding agents, can be used for compounding the friction material of the present invention. Such obsolete binding agents, however, generally do not provide the excellent bonding properties of binding agents in accordance with the present-day technology and, therefore, do not constitute a preferred practice of the present invention. Typical of such form of binding agents are various vegetable drying oils, among which linseed and tung oil are exemplary, coal tar resins, natural gums, asphalts of high melting points, starch products including casein and other starch derivatives, and the like. A particular disadvantage of such former binding agents is that they usually are of a thermoplastic nature, resulting in a heat softening thereof when subjected to the temperatures frequently encountered in their frictional use which detracts from the strength and integrity of the friction material under such elevated temperature conditions.

The friction lining composition, in addition to the reinforcing material and binding agent, may further include one or more, or mixtures of, a variety of well-known filler materials which serve as an inert extender and also contribute toward a modification and/or control of the coefficient of friction of the friction lining. Filler materials of the foregoing type are broadly employed in amounts as high as 80 percent of the friction lining material but more usually range from about 5 to 60 percent, and more typically from about 10 to about 50 percent. Typical of the various common filler materials that can be incorporated either primarily for their extender characteristics or primarily for their friction-modifying properties are litharge, barytes, various clays, zinc oxide, graphite, molybdenum disulfide, carbonaceous fillers including carbon black, thermal black, lamp black, coke, etc., metallic particles such as lead powder, copper powder, brass powder, bronze powder, iron powder, aluminum powder, etc.; refractory substances which generally possess a high coefficient of friction including, for example, aluminum oxide, silicon dioxide, feldspar, titanium dioxide, iron barytes, zircon, or the like; various organic materials, such as wood flour, leather flour, coconut shell flour, cork particles, etc.; as well as organic materials in a generally fibrous form such as cotton linters, cellulose fibers, and the like, which may also be appropriately classified as reinforcing materials; and miscellaneous particulated filler materials including mica, magnesium sulfate, magnesium oxide, sodium borate, calcium sulfate, barium chromate, iron oxide, diatomaceous earth, rosin, gilsonite, etc.

The friction lining material, in addition to the aforementioned reinforcing materials, fillers and binding agents, incorporates, in accordance with the present invention, a controlled amount of a fluorocarbon resin which preferably is in a particulated form and is distributed substantially uniformly throughout the composition such that the operative face of the lining will have exposed a substantially constant surface area of the fluorocarbon resin during the course of lining wear. The unique friction-modifying characteristics of the friction lining comprising the present invention have been found attainable only by employing polytetrafluoroethylene (PTFE) and/or fluorinated ethylene propylene (FEP), the latter comprising an interpolymer of hexafluoropropylene and tetrafluoroethylene.

The fluorocarbon resin can be incorporated in the friction lining in amounts broadly ranging from about 5 up to about 75 percent and preferably from about 10 to about 60 percent. The specific amount of the fluorocarbon resin used will vary in consideration of such factors as the nature and frictional characteristics of the other components of which the friction lining is comprised, the specific physical form in which the fluorocarbon resin is added, the specific use in which the friction lining is to be employed and the desired frictional properties of the lining consistent with that intended end use. The inclusion of the fluorocarbon resin in amounts less than about 5 percent ordinarily does not provide a sufficient modification of the coefficient of friction properties of the lining to achieve an appreciable benefit of the present discovery. On the other hand, the inclusion of the fluorocarbon resin in amounts substantially in excess of about 75 percent of the friction material generally causes difficulty with most binding agents in achieving a tenaciously bonded integral friction lining matrix. It is for this reason that the quantity of the fluorocarbon resin employed is generally controlled from about 5 to about 75 percent and more usually in amounts ranging from about 10 to about 60 percent of the lining material.

The specific form in which the fluorocarbon resin is incorporated in the friction lining composition effects, to some extent, the net modification in the frictional characteristics of the resultant lining produced. In accordance with a preferred practice of the present invention, the fluorocarbon resin is admixed in the form of a powder in which the particle size ranges from about 6 mesh down to about 325 mesh or less, and preferably from about 20 mesh to about 60 mesh. The particles are preferably of an irregular shape to enhance their mechanical interlock and entrapment within the matrix of the friction lining and to enhance their retention at the exposed operating surface thereof, resisting dislodgment in response to frictional contact with the braking member such as the drum or the disk. While particles of a size above the upper desired average particle size can be employed, in some instances it has been found that particles of this size magnitude are more difficult to uniformly distribute through the friction composition, resulting in lining working surfaces which vary in their exposed fluorocarbon surface area as the lining wears. It is for this reason that the particle size of the fluorocarbon resin is preferably controlled so as to be predominantly less than about 6 mesh. On the other hand, when the particle size of the fluorocarbon constituent is substantially less than about 325 mesh, difficulty has been encountered in some instances in forming a uniform mixture of the several constituents prior to curing of the lining matrix and such smaller particles require an increase in the proportion of binding agent required to form an integral friction lining matrix. In view of the foregoing, the most satisfactory results have been attained when the particle size of the fluorocarbon constituent is within the preferred range of about 20 to about 60 mesh.

It is also contemplated within the scope of the present invention that the fluorocarbon constituent can be incorporated in the friction lining composition in the form of fibers or filaments either by themselves or in combination with particles of the fluorocarbon constituent. When introduced wholly or partly in the form of filaments, it is preferred that the filaments range in length from about one thirty-second inch to about one-half inch, and preferably from about one-sixteenth inch to about one-fourth inch, and have a diameter ranging from about 0.005 inch to about one-sixteenth inch. Filaments within the aforementioned size ranges can be readily intermixed with and substantially uniformly distributed throughout the friction lining composition prior to curing.

In addition to the foregoing, it is also contemplated that the fluorocarbon constituent can be incorporated in the lining in the form of exposed surface sections extending inwardly from the face surface of the lining, such as in the form of interlocked inserts or buttons, as subsequently to be described in connection with FIGS. 4—7, effecting a modification of the frictional characteristics thereof.

The friction lining composition containing the controlled proportion of the fluorocarbon resin can readily be formed into brake blocks or linings of the desired size and configuration by forming a suitable dry mixture to which the binding agent is added, either in a dry or liquid form, and the resultant composition molded, extruded or otherwise formed into cured friction members or enlarged sections from which such individual members are subsequently cut.

Typical of the various forms in which the friction lining of the present invention can be employed are the illustrations shown in FIGS. 1—7, inclusive, of the drawings. In the embodiment illustrated in FIG. 1, a ventilated-type disk brake is fragmentarily illustrated including a rotor 10 having annular faces 12 and 14, which are adapted to be disposed in frictional sliding contact with brake shoes 16 and 18, respectively, having bonded to the opposed surfaces thereof lining segments 20. The lining segments 20 may be in the form of a continuous annular strip or in the form of a series of circumferentially spaced lining segments. The frictional lining can be secured to the brake shoe in accordance with well known prior art techniques, including mechanical fasteners, such as rivets or, alternatively, a high-strength adhesive, such as the adhesive layer 22 illustrated in FIG. 1.

Another typical application of the friction lining composition is as a lining 24 on an arcuate brake shoe 26, as illustrated in FIGS. 2 and 3 of the drawing. In the specific embodiment illustrated, the lining 24 is secured to the face of the arcuate shoe 26 by means of rivets 28, the heads of which are recessed beneath the operating surface of the lining. The lining, as illustrated in the magnified view of FIG. 3, is characterized as consisting of a matrix of the conventional reinforcing, filler and binder materials having interspersed therethrough a plurality of discrete particles of the fluorocarbon resin indicated at 30.

An alternative composite friction lining incorporating sections of the fluorocarbon resin in combination with conventional lining sections is illustrated in FIGS. 4-7. In the embodiment shown in FIGS. 4 and 5, a composite lining is mounted on an arcuate shoe 32 consisting of alternating sections of a friction lining material 34 and transversely extending sections or inserts 36 of the fluorocarbon resin. The friction lining segments 34 may comprise a conventional friction lining of the types heretofore enumerated for forming the matrix to which the fluorocarbon resin is added or, alternatively, may be comprised of friction lining materials of the types previously described in connection with FIGS. 1-3 incorporating particles or filaments of the fluorocarbon resin dispersed through the lining matrix. As shown in FIGS. 4 and 5, the fluorocarbon resin inserts 36 are securely fastened to the web of the arcuate shoe by means of rivets 38 having their heads recessed beneath the operative surface of the friction lining material.

An alternative embodiment of the composite lining shown in FIGS. 4 and 5 is illustrated in FIGS. 6 and 7 in which an arcuate friction lining 40 is provided with a plurality of stepped circular apertures 42 therein in which inserts 44 of a fluorocarbon resin are disposed and mechanically interlocked therein. The disposition of the apertures 42 and the inserts 44 is preferably arranged so as to transversely overlap as viewed in a longitudinal direction. As best seen in FIG. 7, the apertures 42 in the friction lining are formed with an enlarged shoulder 46 adapted to receive a headed portion 48 of the insert, restricting undesirable outward movement of the insert relative to the friction lining. The friction lining 40 similarly may comprise composition-type friction linings of the types heretofore known or may be modified in accordance with the present invention to incorporate a controlled proportion of fluorocarbon particles therein to further supplement the friction-modifying characteristics supplied by the inserts 44. The friction lining 40 can be secured to the arcuate brake shoe by bonding or riveting as previously discussed, maintaining the inserts in interlocked relationship against the supporting web of the arcuate brake shoe.

The unique dynamic frictional characteristics of friction linings made in accordance with the practice of the present invention is graphically illustrated in FIG. 8. The data portrayed in FIG. 8 were obtained on a brake dynamometer employing a brake having a friction lining material corresponding to that described in Example 1. The tests were conducted at hydraulic brake line pressures of 800, 600 and 400 pounds per square inch at wheel speeds corresponding to initial vehicle speeds of 60 miles per hour and maintaining the brake line hydraulic pressure constant during the deceleration of the wheel to a complete stop. As will be noted, the brake torque in foot pounds at constant braking force decreases as vehicle speed decreases, evidencing a progressive braking action by the friction materials in response to a reduction in the relative sliding speed between the friction material and brake drum. This reduction in braking action, even at a constant brake line hydraulic pressure, reduces the tendency of wheel lockup which is particularly effective when employed on the rear wheels of a vehicle to reduce the skid characteristics of vehicles during rapid deceleration on slippery pavements. Conventional friction linings of the types heretofore known characteristically provide a progressive increase in brake torque in response to a progressive decrease in vehicle speed at constant brake line hydraulic pressure, which characteristic is conducive toward effecting wheel lockup, particularly in one or both rear wheels of a vehicle initiating a skid and loss of control during deceleration on slippery pavements. The foregoing brake dynamometer tests also evidenced a superiority in wear resistance of linings made in accordance with the practice of the present invention, as well as the elimination of usual brake noises including squeal, wire brush, and groan associated with brake linings of the general types heretofore known.

In order to further illustrate the improved friction lining composition of the present invention, the following examples of suitable materials are provided. It will be appreciated that the examples are provided for illustrative purposes and are not intended as being restrictive of the various constituents of which the friction lining can be comprised as herein described and as set forth in the subjoined claims.

EXAMPLE 1

A molded type friction lining in accordance with the practice of the present invention is prepared by forming a mixture of the following constituents in the proportions expressed in terms of percent by weight.

| Constituent | Percent |
| --- | --- |
| Asbestos fibers | 15 |
| Phenolic resin | 25 |
| Polytetrafluoroethylene | 60 |

The asbestos fibers employed are a grade 5R563, while the phenolic resin is a powdered resin having a particle size less than 300 mesh (U. S. Standard Sieve Size). The polytetrafluoroethylene particles are of an irregular shape having an average particle size of about 40 mesh (U. S. Standard Sieve Size).

The resultant mixture is placed in a conventional brake lining mold and is compacted under a pressure of about 1,000 psi at about 400° F. for a period of about four hours. A lining of this type possesses frictional characteristics as previously described in connection with FIG. 8.

EXAMPLE 2

A molded friction lining is prepared employing the same procedure and constituents as described in Example 1, but wherein the proportions of the materials are as follows:

| Constituent | Percent |
| --- | --- |
| Asbestos fibers | 45 |
| Phenolic resin | 25 |
| Polytetrafluoroethylene | 30 |

EXAMPLE 3

A molded brake lining is prepared in the same manner as described in connection with Example 1 incorporating the following constituents:

| Constituent | Percent |
| --- | --- |
| Asbestos fibers | 30 |
| Phenolic resin | 25 |
| Polytetrafluoroethylene | 45 |

In this specific instance, the asbestos fibers are of a 5RO4 grade, while the phenolic powder and polytetrafluoroethylene particles are the same as those described in Example 1.

As previously indicated, other binders, reinforcing materials and filler materials can be employed in combination with the fluorocarbon resin additive which can be processed in conventional brake lining molding equipment. Ordinarily, when phenolic resin binders are employed, molding temperatures of from about 400° to about 450° F. are common, while mold pressures generally range from about 500 psi up to about 3,000 psi.

While it will be apparent that the description of the preferred embodiments and the specific examples disclosed are well calculated to achieve the advantages and benefits of the present invention, it will be appreciated that the invention is susceptible to modification, variation and change without deviating from the spirit thereof.

What is claimed is:

1. A vehicle brake assembly comprising a braking member and a friction member adapted to be disposed in frictional contact with said braking member during a braking action, said friction member including a nonferrous friction element comprising from about 10 to about 90 percent of a fibrous reinforcing material, up to about 80 percent of a particulated filler, from about 5 to about 60 percent binding agent, and from about 30 to about 75 percent of a particulated fluorocarbon resin selected from the group consisting of polytetrafluoroethylene and fluorinated ethylene propylene.

2. The brake assembly as defined in claim 1, wherein said fluorocarbon resin is present in the form of a plurality of irregularly-shaped particles ranging in size from about 20 mesh to about 40 mesh and distributed substantially uniformly throughout said friction element.

3. The brake assembly as defined in claim 1, wherein said fluorocarbon resin is present in the form of a plurality of irregularly shaped particles ranging in size from about 6 mesh to about 325 mesh and distributed substantially uniformly throughout said friction element.

4. The brake assembly as defined in claim 1, wherein said fluorocarbon resin is present in an amount of about 30 percent.

5. The brake assembly as defined in claim 1, wherein said fluorocarbon resin is present in an amount of about 45 percent.

6. A vehicle brake assembly comprising a braking member and a friction member adapted to be disposed in frictional contact with said braking member during a braking action, said friction member including a composite friction element comprising a first section of a friction material comprising from about 10 to about 90 percent of a fibrous reinforcing material, up to about 80 percent of a particulated filler and from about 5 to about 60 percent binding agent; and a second section comprised of a fluorocarbon resin selected from the group consisting of polytetrafluoroethylene and fluorinated ethylene propylene, said first and said second section defining a composite face surface adapted to contact said braking member.

7. The brake assembly as defined in claim 6, in which said friction material of said first section further includes from about 5 to about 75 percent of said fluorocarbon resin distributed therethrough.

8. The brake assembly as defined in claim 6, in which said composite friction element comprises a plurality of said first and said second sections disposed in alternating relationship.

9. The brake assembly as defined in claim 6, wherein said first and said second section of said composite friction element extend inwardly of said composite face surface to a depth corresponding at least to the useful thickness of said friction element.

10. The brake assembly as defined in claim 6, in which said composite friction element is comprised of said first section formed with a plurality of cavities therein and wherein said second section is in the form of a plurality of inserts disposed in said cavities.

11. The brake assembly as defined in claim 10, wherein said inserts are mechanically interlocked in said cavities of said first section.

* * * * *